March 12, 1929.  F. RICKS  1,704,991
SHOE STIFFENER AND METHOD OF MAKING THE SAME
Filed June 1, 1927
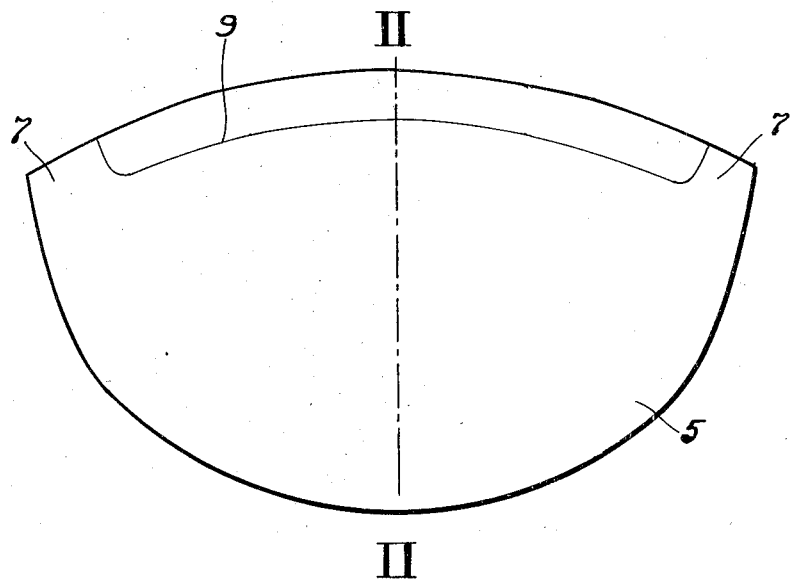
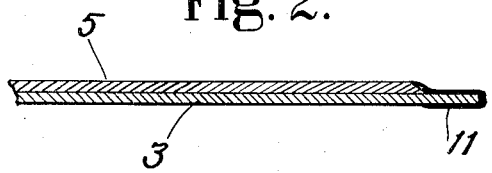

Patented Mar. 12, 1929.

1,704,991

UNITED STATES PATENT OFFICE.

FRED RICKS, OF LEICESTER, ENGLAND, ASSIGNOR TO UNITED SHOE MACHINERY CORPORATION, OF PATERSON, NEW JERSEY, A CORPORATION OF NEW JERSEY.

SHOE STIFFENER AND METHOD OF MAKING THE SAME.

Application filed June 1, 1927, Serial No. 195,692, and in Great Britain June 11, 1926.

This invention relates to thermoplastic stiffeners for boots and shoes and to methods of making them, and is herein exemplified in its application to a toe stiffener particularly adapted for use in so-called "soft-toed" or "plain vamp" shoes which have no toe cap or tip and to the manufacture of such a stiffener.

In the manufacture of shoes of the kind referred to, it is particularly desirable to provide a gradual decrease in stiffness from the stiff body portion of the toe stiffener to the pliable rear edge so that no sharply defined ridge shall be visible across the toe portion of the finished shoe. To this end it has been customary to thin the rear margin of such toe-stiffeners so as to provide them with wide flexible margins. The usual thermoplastic substances, however, if in such thin films or layers as they must be in thin margins of the kind described, are liable to crumble if subjected to considerable or repeated deformation.

In view of the foregoing, in one aspect the invention provides a stiffener having in one portion a thermoplastic stiffening substance of a given resilience and in another portion a different stiffening substance of greater resilience than that of the first-named substance. The illustrative toe stiffener comprises a fibrous base all except the rear margin of which is thoroughly impregnated with a usual thermoplastic substance, such as a mixture of 75% colophony and 25% of blown asphalt, its rear margin being substantially free from this thermoplastic substance but being coated and to an extent impregnated with celluloid. The celluloid has a greater resilience than that of the thermoplastic substance and is capable of reassuming its original shape after repeated deformations for a much longer period than is the thermoplastic substance.

In another aspect the invention provides a method which comprises cutting from a piece of sheet material, impregnated with a thermoplastic stiffening material of a given resilience, a blank of the desired outline, removing material from a margin of the blank and thereafter treating said margin with a different stiffening material of a greater resilience than that of the first-named stiffening material.

Referring now to the accompanying drawings,

Fig. 1 is a plan of a toe-stiffener in which the invention is embodied, and

Fig. 2 is a cross section through a portion of the toe-stiffener on the line 2—2 of Fig. 1, Fig. 2 being upon an exaggerated scale.

The illustrated stiffener is a laminated one comprising two layers or liminations 3, 5 of fibrous sheet material such as cotton fabric. The thermoplastic stiffening substance with which both layers are impregnated is conveniently used as the bond between the layers, this substance being, for example and in the stiffener illustrated, the mixture of colophony and blown asphalt which has been referred to above. The laminated material is conveniently produced in sheet form by leading the layers separately under separate guide rolls into a tank of molten thermoplastic substance, the layers being thereafter led under a common guide roll while still immersed in the substance so as to be superposed one upon the other in the molten substance. The composite sheet, as it leaves the tank, is passed between rollers which compact the layers and then allowed to stand until the thermoplastic substance has hardened. Thereafter the blanks are died out from the sheet. The rear margin of each blank is skived by cutting away partly or wholly the rear margin of the layer 5 so as to leave the then projecting margin of the layer 3 uncut, the thin margin of the layer 3 thus forming all or nearly all of the rear margin of the stiffener. In the manufacture of the illustrated stiffener the cutting has been so carried out that the ends 7 of the rear margin of the layer 5 have been left uncut. The purpose of this is to provide stout portions at the ends, since these portions are grasped by the pincers of the pulling-over machine. The stiffener, as thus far described, is or may be substantially the same as that shown in United States Letters Patent No. 1,559,645 granted Nov. 3, 1925, upon an application filed in my name. In order to remove most or all of the thermoplastic substance from the rear margin of the toe stiffener, such subtance may be expressed from the rear margin of the stiffener, for example, by the use of heated pressure rolls after the manner described in application Serial No. 759,084 filed Dec. 31, 1924, in the names of William H. Bancroft, William J. Lund and Maurice G. Hill.

The stiffener, from the thin rear margin of which part or substantially all of the thermoplastic substance has been removed, is now treated with a different stiffening substance, such, for example, as celluloid, which has a greater resilience than that of the thermoplastic stiffening substance. Conveniently, the margin of the stiffener may be dipped in a celluloid solution, or the solution may be applied to the margin by means of a brush. In either case, while the greater portion of the margin, from its edge inwards will have a very thin coating on it, a certain amount of the solution will collect in the angle at the rear edge 9 of the layer 5 so that, when the solvent has evaporated, the celluloid will appear somewhat as shown in Fig. 2. The margin will be coated on both sides with a very thin film 11, and the corner at the edge 9 of the layer 3 will be filled with celluloid.

By providing a rear margin which is very flexible and at the same time resilient, a thermoplastic toe stiffener is obtained which is particularly suitable for use in plain vamp shoes, since the rear margin of such a stiffener affords proper support for the leather above it and at the same time is so flexible that no objectionable ridge is produced in the leather.

Although a particular stiffener and a particular method of making it have been set forth, it should be understood that the invention is not limited in the scope of its application to the particular article and method which have been described.

Throughout the appended claims, the word "resilience" is used to denote the capability of a body or substance to reassume substantially its original shape after having been considerably or repeatedly deformed.

Having thus described my invention, what I claim as new and desire to secure by Letters Patent of the United States is:

1. A stiffener for boots and shoes comprising a base, having in one portion a thermoplastic stiffening substance of a given resilience and in another portion a different stiffening substance of a greater resilience than that of the first-named substance.

2. A toe stiffener for boots and shoes comprising a base, having in its body portion a thermoplastic stiffening substance of a given resilience and at its rear margin a different stiffening substance of a greater resilience than that of the first-named substance.

3. A toe stiffener for boots and shoes having its body comprising a fibrous base, having its body portion impregnated with a thermoplastic stiffening substance of a given resilience and its rear margin thinner than the body portion and carrying a different stiffening substance of a greater resilience than that of the first-named substance.

4. A toe stiffener for boots and shoes comprising a fibrous base having its body portion impregnated with a thermoplastic stiffening substance and its rear margin substantially free from that substance and carrying an ester of cellulose.

5. The method of manufacturing a stiffener which comprises cutting from a piece of sheet material impregnated with a thermoplastic stiffening material of a given resilience, a blank of the desired outline, removing material from a margin of the blank, and thereafter treating said margin with a different stiffening material of a greater resilience than that of the first-named stiffening material.

6. The method of manufacturing a stiffener which comprises cutting from a piece of sheet material impregnated with a thermoplastic stiffening substance of a given resilience a blank of the desired outline, expressing thermoplastic substance from one margin of the blank, and thereafter treating said margin with a different stiffening substance of a greater resilience than that of the first-named substance.

7. The method of manufacturing a stiffener which comprises cutting from a piece of sheet material impregnated with a thermoplastic stiffening substance of a given resilience a blank of the desired outline, thinning a margin of the blank, expressing thermoplastic material from the thinned margin, and treating the margin with a solution of an ester of cellulose.

In testimony whereof I have signed my name to this specification.

FRED RICKS.